Jan. 16, 1951   R. POLK, SR., ET AL   2,538,591
FRUIT HANDLING METHOD AND APPARATUS
Filed Sept. 26, 1946   3 Sheets-Sheet 2

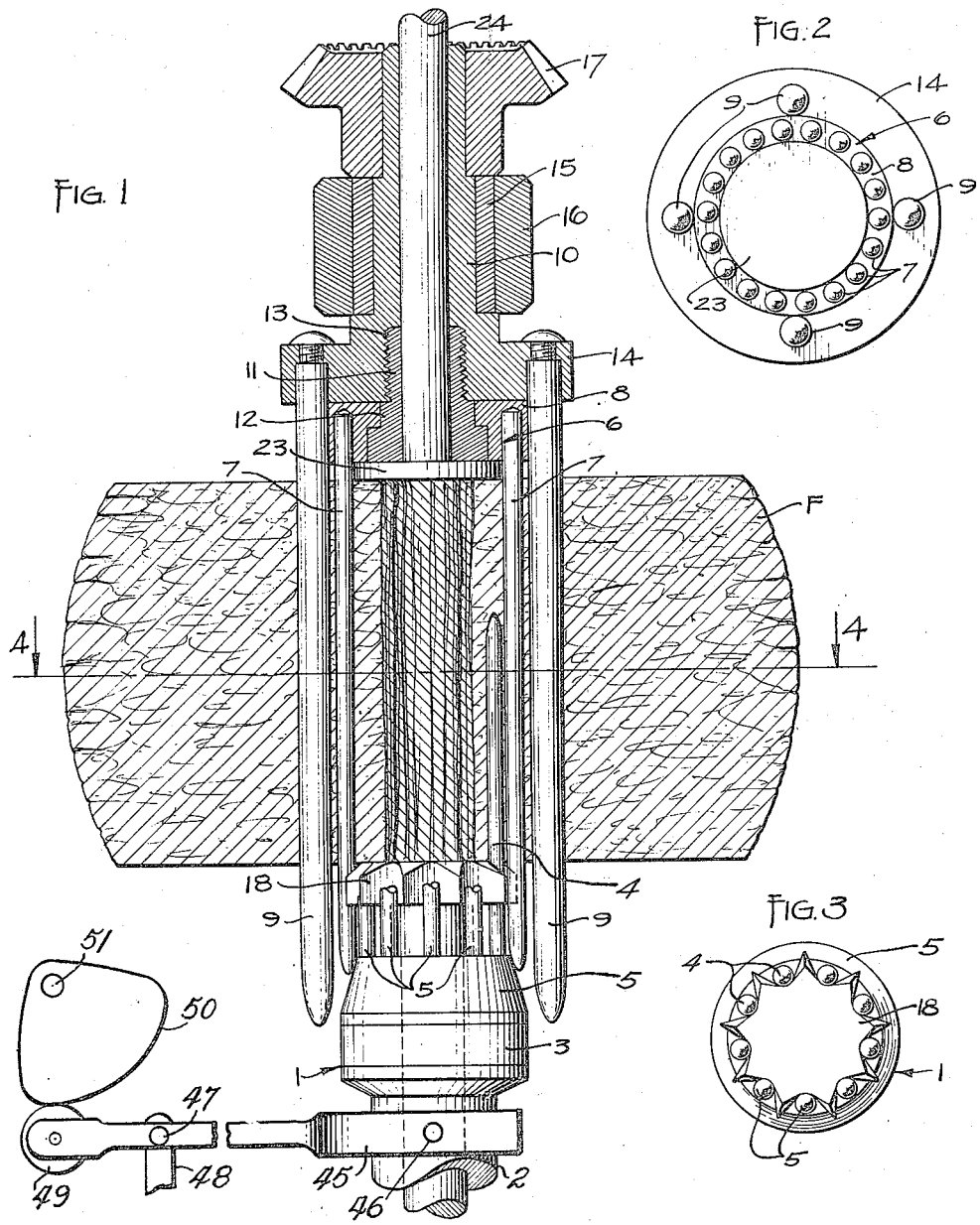

INVENTORS
RALPH POLK, SR. & RALPH POLK, JR.
BY
Semmes, Keegin and Semmes
ATTORNEYS

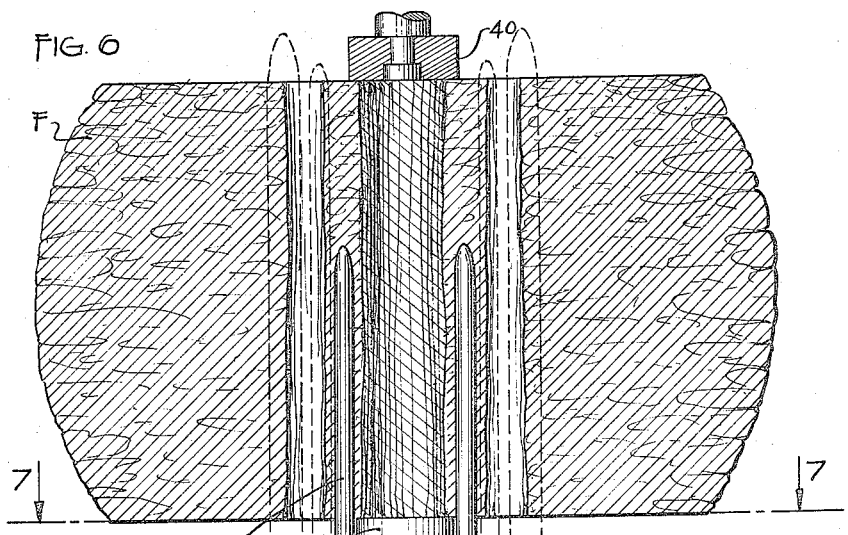
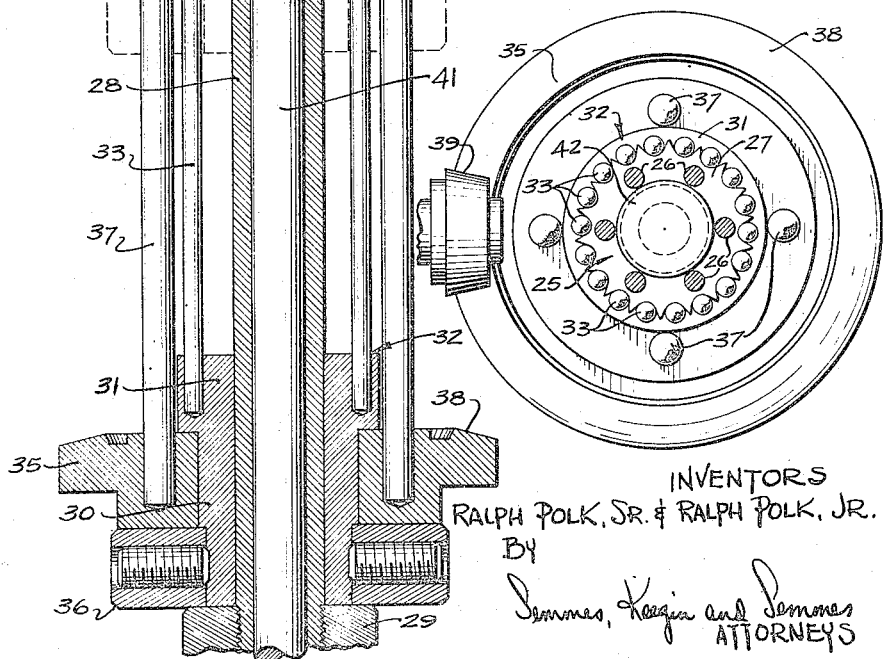

Patented Jan. 16, 1951

2,538,591

UNITED STATES PATENT OFFICE 2,538,591

FRUIT HANDLING METHOD AND APPARATUS

Ralph Polk, Sr., and Ralph Polk, Jr., Tampa, Fla., assignors to The Polk Development Company, Tampa, Fla., a copartnership of Florida Application September 26, 1946, Serial No. 699,433

5 Claims. (Cl. 146—236)

This invention relates to the handling of citrus fruit and more particularly to a method and apparatus for supporting and holding the center structure of citrus fruit for the purpose of sectionizing the fruit.

"Sectionizing" in the citrus fruit industry is dividing the meat of the fruit into its membrane free, substantially whole natural sections and is carried out by first removing the peel and the portion of the membrane wall lying adjacent thereto, and then severing the bond between the meat and the radial portions of the membrane. During this latter operation the fruit is held on a spindle which usually comprises a circular series of parallel tines on which the fruit is impaled polarwise close to the core of the fruit.

We have developed machinery for mechanically sectionizing the fruit in which the peeled fruit is first impaled on a holding fork, such as disclosed in our Patent 2,199,345, the circular series of its tines being inserted into apieces of the radial segment walls. Blades are then inserted polarwise through the segments just radially outside the series of holding tines, either with or without polarwise voids having first been formed therein by a rotary drill mechanism, such as shown in our Patent 2,155,768. These knives are moved radially outward from the core and closely adjacent one radial membrane wall which severs the meat of the segments from this wall but leaves it still attached and supported by the other radial wall. Next, a circular series of wiper prongs carried on a rotatable spindle are inserted polarwise through the fruit concentric with and just outside the series of holding tines. This series of prongs is then rotated relatively to the tines which has the effect of wrapping the radial membranes, which are held by the tines, about the circular series of tines and stripping the segment meats from the attached radial membranes.

In the preliminary steps of drilling the axial voids through the segments, and the slitting operations, it is desirable that the tines of the holding fork be inserted as close to the core of the fruit as possible. This obviously restricts the diameter of the series of tines and, as a consequence, restricts the number of tines in the series unless they are spaced so closely together as to make insertion in the fruit difficult. For the stripping operation, however, it is desirable that at least one tine of the holding fork be inserted in the apex region of each fruit segment in order to hold the entire radial membrane structure while the meats are being stripped therefrom by the wiper prongs.

Some fruits have as many as fifteen or sixteen segments and to arrange sufficient tines in the holding fork for insertion in all of the segments of such fruit while still spacing them sufficiently far apart circumferentially to permit insertion without mutilation of the meat, the tines would be spaced radially so far outward from the core as to prove wasteful of the meat, particularly in the operations of drilling and slitting preliminary to stripping as above set forth. Thus while a disadvantage in the preliminary sectionizing operations, a holding fork having tines arranged in a comparatively large circle is advantageous in the segment meat stripping operation, not only in permitting a sufficient number of tines for penetrating each fruit segment, but also in assuring penetration of the segments of the fruit having relatively large cores.

It is therefore an object of this invention to provide means for holding citrus fruit for the purpose of sectionizing the same which comprises a primary holding fork having only a sufficient number of tines to centrally position and support the fruit on the fork, and a secondary holding fork, supplementing the primary fork, and having a sufficient number of tines to penetrate each segment of the fruit.

Another object of the invention is to provide holding means of the above character, in which the tines of the primary fork are arranged in a circle of a relatively small diameter to penetrate the fruit closely adjacent the core, and the tines of the supplementary fork are arranged in a circle of somewhat larger diameter to penetrate the segments radially outside the circle of tines of the primary fork.

Still another object of the invention is to provide holding means of the above character, the supplementary fork having wiper elements associated therewith and rotatable about its circular series of tines to strip the segment meats from the membrane held by the tines.

A further object of the invention is to provide a method of sectionizing citrus fruit in which a portion of the meat surrounding the core is removed or crushed to reduce its resistance to penetration of a holding fork having a sufficient number of tines to penetrate the apex region of each fruit segment.

A still further object of the invention is to provide a method of the above character, in which the fruit is impaled on a primary holding fork inserted close to the core of the fruit and held thereby during the preliminary operations of preparing the fruit for the insertion of the supplementary fork.

With the above and other important objects and advantages in view, the invention consists in the parts and combinations and procedural steps, hereinafter set forth, with the understanding that various changes may be made therein by those skilled in the art, such as in the order of the procedural steps or in the construction or arrangement of the parts in the combinations, without departing from the spirit of the invention.

In order to make the invention more clearly understood, there are shown in the accompanying drawings, two embodiments of apparatus for carrying the invention into practical effect.

In the drawings:

Figure 1 is a transverse sectional view of one embodiment of the holder according to the invention, parts being shown in elevation and parts being broken away.

Figure 2 is an end view of the lower or primary fork of the holder shown in Figure 1.

Figure 3 is an end view of the upper or supplementary fork shown in Figure 1 and its associated stripping prongs.

Figure 6 is a transverse sectional view, parts being shown in elevation, of a modified embodiment of the holder.

Figure 7 is a cross sectional view taken along the line 7—7 of Figure 6, looking in the direction of the arrows.

Figure 5:
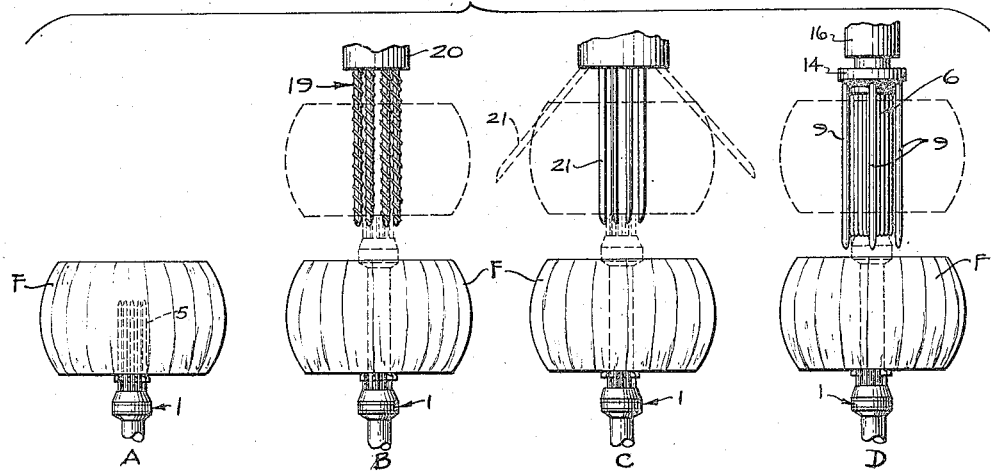
Figure 5 is a diagrammatic view showing a series of steps performed in sectionizing citrus fruit employing the holder shown in Figure 1.

Generally the holder, according to this invention, comprises two holding forks, one supplementary to the other in holding substantially the entire center structure of a citrus fruit, such as grapefruit, during sectionizing thereof. For convenience the two forks may be called a "primary fork," and "supplementary fork." Each fork has a circular series of parallel tines adapted to penetrate the fruit polarwise about its core. The primary fork has relatively few tines, preferably, only enough to centrally support the fruit on the fork, the tines being arranged in a circle of comparatively small diameter to engage the fruit close to the core and permit operations on the meat of the fruit outside the circle of tines but close to the apieces of the radial membrane walls of the fruit segments. The number of tines in the supplementary fork, on the other hand, are preferably in excess of the number of segments usually found in citrus fruit to assure at least one tine penetrating each fruit segment. The tines of the supplementary fork are arranged in a circle of larger diameter than that of the primary fork, the circle being large enough to provide adequate circumferential spacing between the tines to permit easy penetration of the fruit. In use, the supplementary tines are inserted through the fruit outside the circle of the primary tines in a region of the fruit in which resistance to the passage of the tines has been reduced by operations on the meat while supported by the preliminary fork.

To provide for stripping the segment meats from their radial membrane walls, in a manner such as disclosed in the above Patent 2,199,345, the supplementary fork has associated therewith, a circular series of wiper elements or prongs which lie parallel to and closely adjacent and outside the circular series thereof and function, by relative rotation of the series of prongs and tines, to strip the segment meats from the radial membrane structure held by the tines.

The primary and supplementary forks may be constructed as separate units, as shown in Figure 1, with the tines opposed and inserted in the fruit from opposite poles thereof, or the two forks may be constructed as a single unit, as shown in Figure 6, with the tines of both forks extending in the same direction and inserted in the fruit from the same pole.

Referring more specifically to the embodiment shown in Figures 1 to 4, the primary holding fork, designated generally as 1, comprises a shaft or spindle 2 which may be mounted by convenient means (not shown) for axial movement, preferably along a vertical axis. The upper end of the spindle 2 is provided with a circular head 3, to the upper face of which is secured a circular series of up-standing tines 4 arranged concentrically about the axis of the spindle 2 and parallel therewith. The upper periphery 5 of the head 3 is preferably frusto-conical for the purpose of axially aligning the supplementary fork with the primary fork as will be described later.

As stated above, the principal function of the primary fork 1 is to center and support the fruit thereon during preliminary operations on the fruit where radial displacement stresses are not particularly great, and the number of tines 4 need only be sufficient for this purpose. From six to nine tines, equally spaced in a one-inch diameter circle, has been found in practice, to be a satisfactory arrangement, this number of tines being sufficiently small not to offer appreciable resistance to penetration into the fruit, and the circle small enough so that the tines penetrate the fruit close to a core of average size. The number of the tines 4, however, is purely arbitrary and more or less than the number specified may be employed. The upper ends of the tines 4 are shaped preferably into somewhat dull or rounded points, and the lengths of the tines are sufficient to penetrate to a substantial depth into the fruit but not completely through the fruit.

Figure 4:
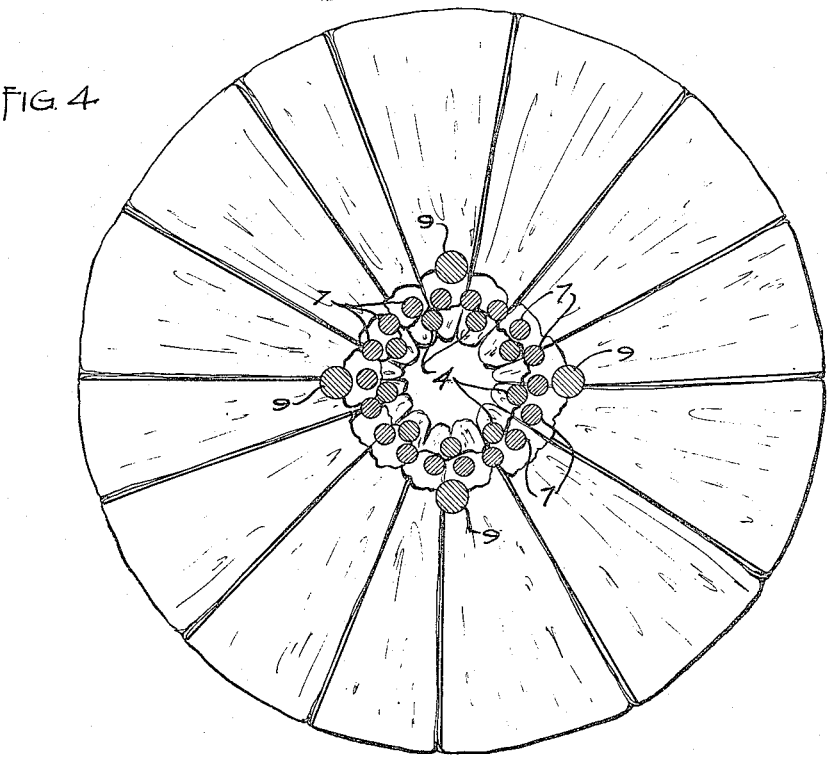
Figure 4 is a cross sectional view taken along the line 4—4 of Figure 1, looking in the direction of the arrows.

Adapted to cooperate with the primary holding fork 1 is the supplementary holding fork, designated generally as 6, and which comprises a circular series of parallel tines 7 secured in a circular head 8 concentrically with and closely adjacent the periphery thereof. The diameter of the series of tines 7 is slightly greater than that of the tines 4 so that when the forks 1 and 6 are brought together into fruit holding relationship, as shown in Figure 1, the series of tines 7 will surround and lie radially just outside the tines 4, as shown in Figure 4. The number of tines in the holding fork 6 is preferably in excess of the maximum number of segments usually found in citrus fruit so that at least one tine will be provided for penetration of every segment. In practice we have found that eighteen tines, equally spaced circumferentially in the series, have proved sufficient to accomplish this result and still keep the diameter of the series sufficiently small to penetrate the segments reasonably close to the core of the fruit. While the tines 4 should penetrate only partially through the fruit, it is desirable that the tines 7 be sufficiently long to penetrate completely through the fruit. The free ends of the tines 7, like the tines 4, have dull points.

Adapted to cooperate with the tines of the holding fork 6, to strip the segment meats from their attached membrane walls, in a manner such as set forth in the above mentioned Patent 2,199,345, are a series of prongs 9, preferably four in number, and arranged in a circular series close to and radially just outside the series of tines 7.

The series of prongs 9 are mounted so that relative rotation between the series of prongs and series of tines may be effected. It may be pointed out that the series of prongs may be rotated with respect to stationary tines, the series of tines may be rotated with respect to stationary prongs, or both tines and prongs may be rotated in opposite directions to obtain the same result. Conveniently, however, the series of prongs are rotated with respect to the series of stationary tines. To this end, the head 8 is rotatably attached to one end of a short shaft 10, in axial alignment therewith, by means of a headed stud 11 passing through a central, counter-bored hole 12 in the head and screwed or otherwise secured into an axial socket 13 in the shaft 10.

The end of the shaft 10 adjacent the head 8, is provided with a radial flange 14 which extends beyond the periphery of the head 8 and has rigidly secured therein the prongs 9, as seen in Figure 1. The shaft 10 is rotatably journalled in a bearing 15 carried by a suitable support, indicated generally as 16, and may be rotated in any convenient manner, such as by means of a gear 17 secured to the shaft 10 and adapted to mesh with a driving gear (not shown). The free ends of the prongs 9 may likewise be dull pointed.

In operation, the forks 1 and 6 are moved together axially into the fruit holding position in any desired manner. Preferably, however, the horizontal position of the supplementary fork 6 is fixed and the lower primary fork moved axially with respect thereto. This may conveniently be accomplished such as by slidably mounting the spindle 2 in a suitable bearing in which it may be splined or otherwise fixed against rotation by well known means. The axial movement of the fork 1 relative to the fork 6 may be obtained, for instance, by means of a yoke 45 secured to spindle 2 by means of a pin 46. The yoke 45 is pivotally mounted at 47 on a suitable support 48 and is provided with a cam follower 49 rotatably mounted at the end of the yoke opposite the end of the pin 46. A cam 50 is keyed to a shaft 51 driven by any conventional means, not shown, and engages the cam follower 49 and imparts axial movement to the fork 1.

As stated above, the head 8 is rotatably mounted on the end of the shaft 10. This is desirable in order that the tines 7 may "hunt" somewhat in their initial penetration of the fruit. In the fruit holding position of the fork 6, however, rotation of the tines should be prevented. This may be accomplished by any convenient means, but preferably there is provided a star shaped disc 18 positioned adjacent the head 2 of the primary fork with the points of the star projecting between adjacent tines and slightly beyond the outer periphery of the series. Thus, when the primary fork 1 is moved into the fruit holding position, with respect to the supplementary fork, the tines 7 will ride between the projecting points of the star shaped disc 18 and be keyed effectively against rotation with respect to the primary fork. It will be noted further, by reference to Figure 1, that when the primary fork is moved into the fruit holding position, the series of the tines 7 will be guided into concentric relation with the series of tines 4 by the pointed ends of the tines 7 engaging the frusto-conical upper periphery of the head 3.

The use of the holding fork is best shown in Figure 5 which illustrates, diagrammatically, a series of steps performed in sectionizing a grapefruit. In step A, it will be noted that a grapefruit F, which has been previously peeled, is impaled centrally thereof on the tines of the primary fork 1. Although a "stubbed" fruit, that is, one in which the polar cap portions of the fruit have been sliced off on parallel lines is shown by way of example in the drawings, it is obvious that fruit peeled in any other manner may also be operated upon. In peeling the fruit, both the outer peel, albedo, and the portion of the membrane wall of the segments lying adjacent the albedo are removed.

After being impaled on the fork 1, the fork is moved into position B under and in axial alignment with a circular series of drills or augers 19 carried for rotation in an operating head 20. This unit may be similar to that disclosed in the above-mentioned Patent 2,155,768 with the drills arranged in a circle of slightly larger diameter than that of the tines of the holding fork 1. The holding fork 1 is then moved axially upwardly so that series of drills pass downwardly through the fruit segments just outside the series of drills 7. One or more drilling operations, with relative angular displacement between the series of drills and the fruit, may be required so that substantially all of the fruit segments will be drilled. The drills 19 serve not only to remove seed from the fruit but also mutilate or weaken the juice cell structure in the regions through which they pass, which facilitates later operations on the fruit, as will be seen.

After drilling, the fork 1 is moved into position C under, and in axial alignment with a circular series of blades 21 carried in an operating head 22 which includes suitable mechanism by means of which the blades may be swung outwardly from the axis of their series. Such blades and operating mechanism are shown in Patent 2,199,345 and a detailed description is not thought necessary. The holding fork 1 is moved axially upwardly so that the series of blades 21 project downwardly through the fruit segments in the regions weakened by the drills 19. When the fork 1 is in its uppermost position, as shown by dotted lines in position C, the blades 21 are moved radially from adjacent the apieces of the segments to the outer periphery of the fruit, following the inner surface of one membrane wall of the segments, which slits or severs the bond between the meat of the segment and one segment wall. This operation may be repeated if necessary, angularly displacing the fruit or the series of knives about their axes between operations, until the meat of each segment has been severed from one of its membrane walls. In this condition, it will be understood that the segment meats still remain attached to the opposite radial membrane wall.

After thus slitting, the fruit is moved by the primary fork 1 under, and into axial alignment with the supplementary fork 6, as indicated in position D of Figure 5. When in position D, where the supplementary fork is brought into use, it will be understood from the foregoing that a circular region of the meat immediately surrounding the tines of the primary holding fork 1 has been so treated that its resistance to penetration has been substantially reduced. As a result, the tines 7 and the prongs 9 will now pass easily through the fruit.

When the fruit is positioned, as shown in position D, the primary fork 1 is raised so that the series of tines 7 penetrate downwardly through the fruit just outside the series of tines 4, and the prongs 9 penetrate just outside the series of tines 7. When in the upper position of the fork 1, as shown by dotted lines in position D, the tines 7 will be locked against rotation by engaging points of the star shaped disc 18, and the series of prongs are then rotated with respect to the tines 7. This will have the effect of wrapping the radial membranes of the fruit spirally around the series of tines 7 and in so wrapping, strip the radial membranes from the relatively stiffer meats, which will fall away from the membrane structure and may be suitably collected. This primary fork 1 may then be moved downwardly away from the supplementary fork 6, and the membrane structure or rag removed from the fork 6. This removal may be accomplished conveniently by means of a disc 23 normally lying adjacent the head 8 and carried on the end of a plunger 24 passing axially through aligned bores in the stud 11 and shaft 10. The periphery of the disc 23 lies closely adjacent the tines 7 so that downward movement of the plunger 24 will cause the disc to slide the rag off of the tines.

In the unitary embodiment shown in Figures 6 and 7, the primary holding fork, which is designated generally as 25, comprises a circular series of upright vertical tines 26 secured in a flange 27 on the upper end of a rod 28. The lower end of the rod 28 is suitably secured rigidly in a vertical position in a support 29 by means of which it may be moved up and down along a vertical axis. The tines 26 are similar in shape to the tines 4 described above, having dull pointed upper ends and lengths sufficient to penetrate substantially into the fruit but not completely therethrough. In this case, six tines are shown, by way of example, arranged in a circle small enough to penetrate the fruit close to the core.

Mounted on the rod 28, for sliding movement between the flange 27 and the support 29, is a sleeve 30 having a flanged upper end 31 which constitutes the head of the supplementary holding fork, designated generally as 32. Secured in the head 31 is a circular series of upright parallel tines 33 which are arranged in a circle concentric with the axis of the rod 28, but slightly larger than the circle in which the tines 26 are arranged, so that the series of tines 33 lie radially outside the series of tines 26 but substantially close thereto. The tines 33 are similar in number to the tines 7 described above, and have dull pointed ends and lengths sufficient to penetrate completely through the fruit. In order to prevent rotation of the series of tines 33, the rim of the flange 27 may be formed with a series of longitudinal grooves 34, corresponding in number to the number of tines 33 and in which the tines 33 ride.

A disc 35 is rotatably mounted on the shank portion of the sleeve 30 between the flanged head 31 and a collar 36 secured to the shank. This disc carries a circular series of wiper prongs 37, similar to the prongs 9, extending upwardly from the disc 35 and concentric with the series of tines 33, just outside the series.

To rotate the series of prongs 37 with respect to the tines 33, to perform the meat stripping operation, such as described above, the outer edge of the upper face of the disc 35 may be beveled, as indicated at 38, to engage a rotating, beveled roller 39 positioned in the path thereof in the extreme upper fruit holding position of the supplementary fork, as indicated by dotted lines in Figure 6.

Except in its fruit engaging action, the holding fork illustrated in Figure 6 functions the same as that described above and illustrated diagrammatically in Figure 5. In its initial position, as shown in full lines in Figure 6, the supplementary fork 32 is lowered with respect to the primary fork 25 so that the sleeve 30 rests on the support 29 and the upper ends of the tines 33 lie below the level of the upper face of the flange 27. In this position, the fruit F is impaled centrally on the tines 26 of the primary fork and the whole unit moved along the central axis thereof, by movement of the support 29, for the operations performed in positions B and C (Figure 5). In the meat stripping position D, however, the sleeve 30 is moved upwardly relative to the rod 28 which causes the tines 33 and prongs 37 to penetrate the fruit, as shown by dotted lines in Figure 6. It may be desirable to provide means such as a swivelled stop member, indicated generally as 40, to engage the upper center of the fruit to inhibit displacement from the primary fork.

When the sleeve 30 reaches its extreme upper position, the beveled edge 38 of the disc 35 engages the rotating roller 39 and the series of prongs will be rotated relatively to the stationary series of tines 33 to strip the segment meats from the radial membrane structure as described above. The supplementary fork may then be lowered with respect to the primary fork which, in this case, will leave the rag on the tines of the primary fork. This may be readily removed such as by a plunger 41 reciprocably mounted in an axial bore in the rod 28 and having a head 42 normally seated on the upper face of the flange 27. It will be evident that upward movement of the head 42, with respect to the tines 26 will push the rag off the tines.

We claim:

1. Apparatus for holding citrus fruit comprising an inner and an outer concentric circular series of parallel tines adapted for insertion polarwise in a fruit adjacent the core thereof, support means respectively for each series constructed and arranged for moving one series axially with respect to the other series whereby the outer series may be inserted later in a fruit supported by the inner series in a region of the fruit surrounding the inner series, the number of tines in said outer series being sufficient for at least one tine to penetrate each segment of the fruit, and the diameter of the outer series being such with respect to the diameter of the inner series that the tines in the outer series will penetrate the segments of the fruit substantially contiguous to the tines of the inner series, whereby the first inserted series serves as a guide for the insertion of the latter inserted series.

2. In an apparatus for sectionizing citrus fruit, an inner circular series of parallel tines arranged to impale the fruit coaxially with and adjacent the core thereof, an outer circular series of tines coaxially aligned with the inner series, the number of tines in the outer series being sufficient for at least one tine to penetrate each section of the fruit; a circular series of parallel wiping prongs concentric with the outer series of tines, a first support comprising axially fixed but relatively rotatable elements respectively carrying the outer series of tines and the series of prongs, a second support for the inner series of tines aligning the inner series coaxially with the outer series, means for relatively moving axially the first and second supports whereby said outer series of tines and series of prongs coincidentally penetrate the fruit impaled on the inner series of tines, and means for rotating the support element for the prongs relatively to the support element for the outer series of tines when penetrated in the fruit to move said prongs circumferentially about the outer series to wrap the radial membrane walls of the fruit section about said series and thereby strip said walls from the meats of the sections.

3. In a method of impaling a citrus fruit on a holding fork of a character having a circular series of parallel tines sufficient in number for at least one tine to be inserted through each section of the fruit in an annular region concentric with and adjacent the core to restrain radial movement of all radial section walls of the fruit outward from the core, the steps of first impaling the fruit polarwise and concentrically with the core to form a circular series of comparatively few circumferentially spaced punctures, said series of punctures penetrating the fruit in regions lying substantially contiguous to regions to be occupied by at least a portion of the tines of the first named fork, and then impaling the fruit on the first named fork with tines thereof moving in alignment with said punctures.

4. In a method of impaling a citrus fruit with a holding fork of a character having a circular series of tines sufficient in number for at least one tine to be inserted through each section of the fruit in an annular region concentric with and adjacent the core to restrain radial movement of all radial section walls of the fruit outward from the core, the steps of first impaling the fruit on a holding fork having a circular series of comparatively few tines with the core of the fruit coaxial with the said series to provide a support for said fruit, mutilating juice sacs of the supported fruit in regions to be occupied by at least a portion of the tines of the first named holding fork, and then impaling the supported fruit on the series of tines of the first named holding fork with the core of the fruit coaxial therewith and with said portion of tines occupying said mutilated regions.

5. In a method of impaling a citrus fruit with a holding fork of a character having a circular series of tines sufficient in number for at least one tine to be inserted through each section of the fruit in an annular region concentric with and adjacent the core to restrain radial movement of all radial section walls of the fruit outward from the core, the steps of first impaling the fruit on a holding fork having a circular series of comparatively few tines with the core of the fruit coaxial with the said series to provide a support for said fruit, drilling the supported fruit polarwise about the core to mutilate the pulp in regions to be occupied by at least a portion of the tines of the first named holding fork, and then impaling the supported fruit on the series of tines of the first named holding fork with the core of the fruit coaxial therewith and with said portion of tines occupying said mutilated regions.

RALPH POLK, Sr.
RALPH POLK, Jr.

REFERENCES CITED

The following references are of record in the file of this patent:

UNITED STATES PATENTS

| Number | Name | Date |
|---|---|---|
| 631,069 | Fenn | Aug. 15, 1899 |
| 1,142,216 | Wolf | June 8, 1915 |
| 2,089,501 | Polk, Jr. | Aug. 10, 1937 |
| 2,089,503 | Polk, Jr. | Aug. 10, 1937 |
| 2,246,896 | Polk, Sr. et al. | June 24, 1941 |